(12) United States Patent
Takeda et al.

(10) Patent No.: US 8,380,936 B2
(45) Date of Patent: Feb. 19, 2013

(54) MULTI-CORE PROCESSOR SYSTEM AND MULTI-CORE PROCESSOR

(75) Inventors: Akira Takeda, Kanagawa (JP); Takeshi Kodaka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 326 days.

(21) Appl. No.: 12/885,754

(22) Filed: Sep. 20, 2010

(65) Prior Publication Data

US 2012/0042133 A1    Feb. 16, 2012

(30) Foreign Application Priority Data

Aug. 11, 2010    (JP) ................................ 2010-180156

(51) Int. Cl.
*G06F 12/00* (2006.01)
(52) U.S. Cl. ........................................................ 711/144
(58) Field of Classification Search ........................ None
See application file for complete search history.

(56) References Cited

U.S. PATENT DOCUMENTS

| | | | |
|---|---|---|---|
| 5,933,857 A | 8/1999 | Brewer | |
| 7,496,713 B1 | 2/2009 | Ward | |
| 2007/0067578 A1 | 3/2007 | Kurichiyath | |
| 2010/0325360 A1* | 12/2010 | Yoshitake et al. | 711/125 |

FOREIGN PATENT DOCUMENTS

| | | |
|---|---|---|
| JP | H10-336215 A | 12/1998 |
| JP | 2000-305841 A | 11/2000 |
| JP | 2004-086926 A | 3/2004 |
| WO | WO 00/00891 | 1/2000 |

OTHER PUBLICATIONS

Tsuboi, Yoshiro, Oota, Yutaka, Yamashita, Takahiro, "Toshiba adopted a homogeneous multicore architecture for their next generation SoC "Venezia"," Nikkei Electronics, Jun. 30, 2008, p. 111, 113-114.

* cited by examiner

*Primary Examiner* — Hiep Nguyen
(74) *Attorney, Agent, or Firm* — Sprinkle IP Law Group

(57) ABSTRACT

According to one embodiment, a state manager classifies an area allocated to the multi-core processor in a first memory area into one of a first state in which allocation to processor cores is not performed, a second state in which allocation to one of the processor cores is performed and read and write are performed, and a third state in which allocation to one or more of the processor cores is performed and read and write are prohibited, and further performs a transition from one of the first state, the second state, and the third state to another. A cache/memory manager writes back a corresponding cache when the state manager performs the transition from the second state to the third state.

20 Claims, 16 Drawing Sheets

| ID | ADDRESS | SIZE | isAllocated |
|----|---------|------|-------------|
| 0  | ...     | ...  |             |
| 1  | ...     | ...  |             |
| 2  | ...     | ...  |             |
| 3  | ...     | ...  |             |
| ⋮  | ⋮       | ⋮    | ⋮           |

| |
|---|
| false |
| true |
| false |
| ⋮ |

| TASK ID | STATE | ADDRESS | SIZE |
|---------|-------|---------|------|
| ⋮ | ⋮ | ⋮ | ⋮ |

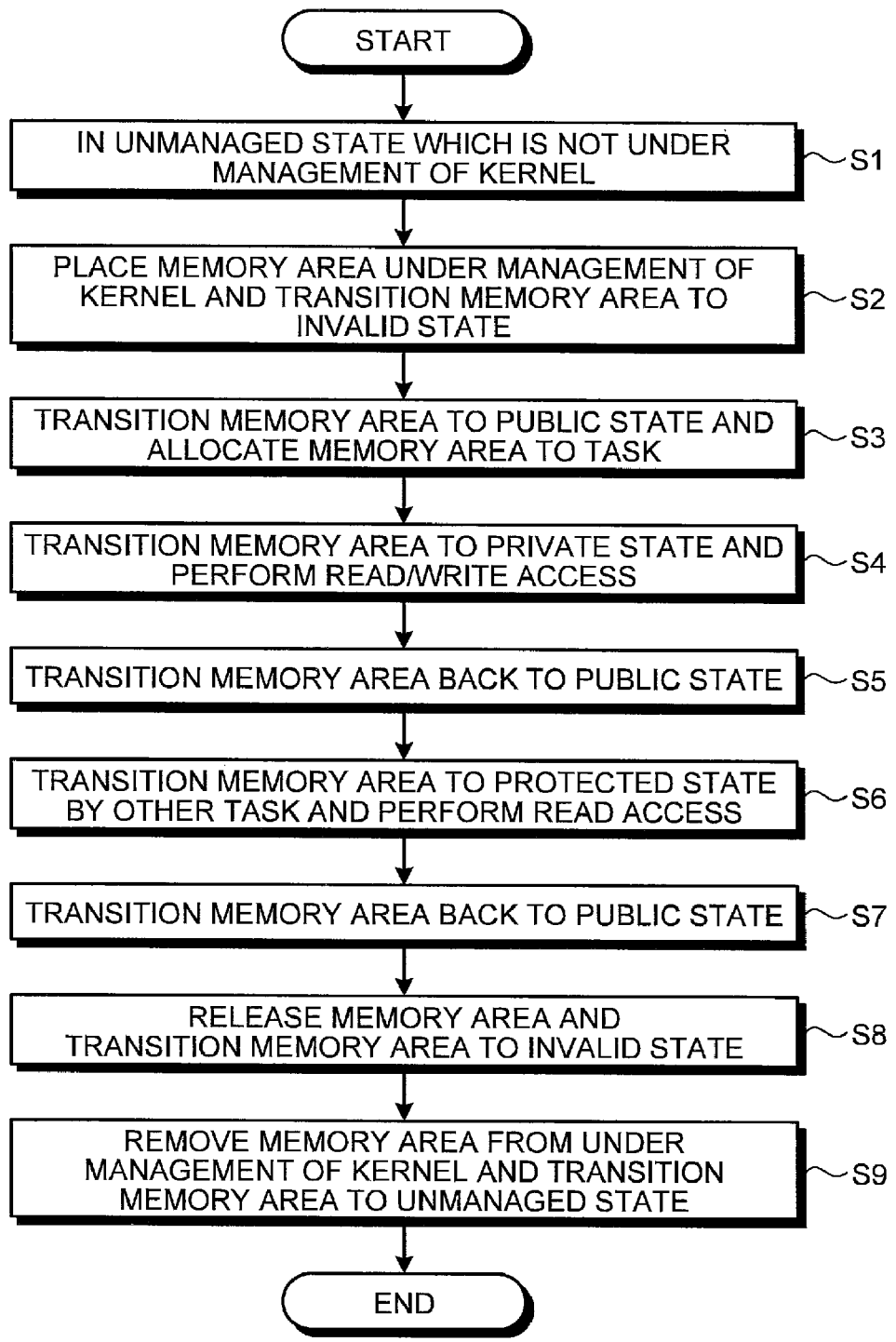

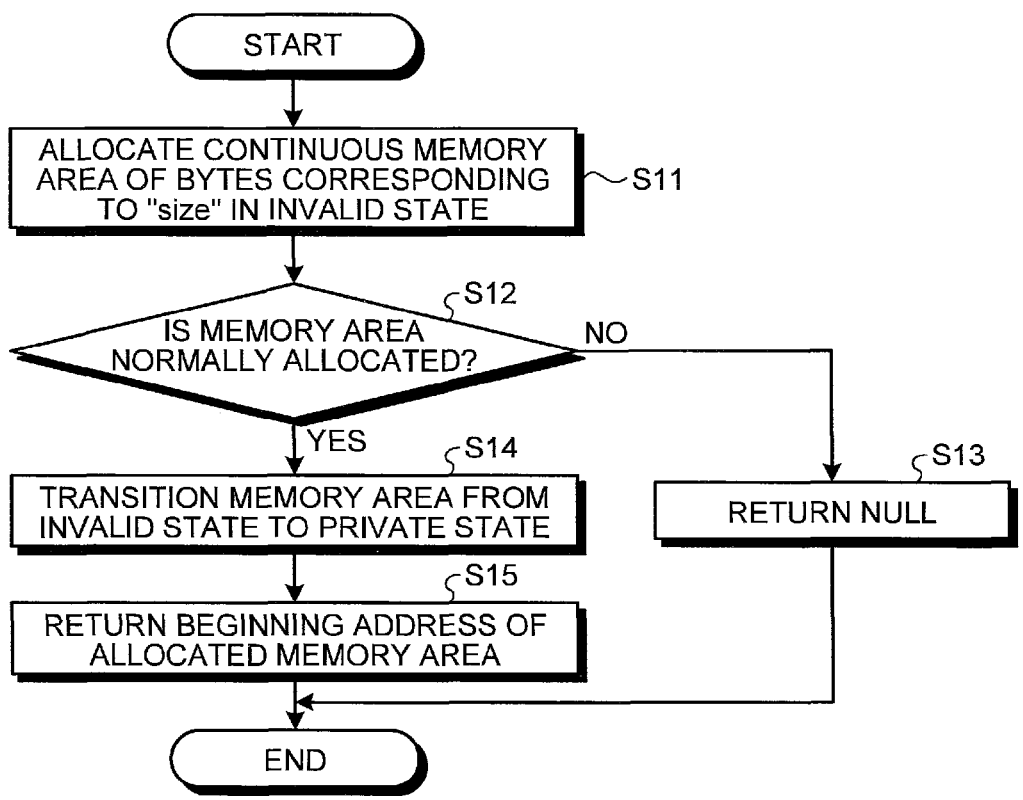
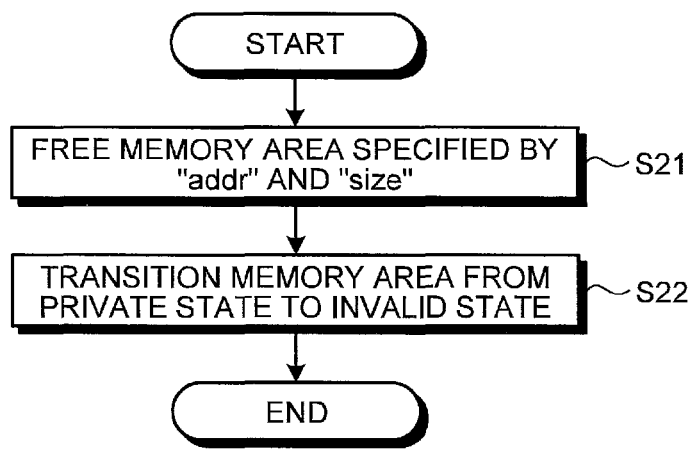

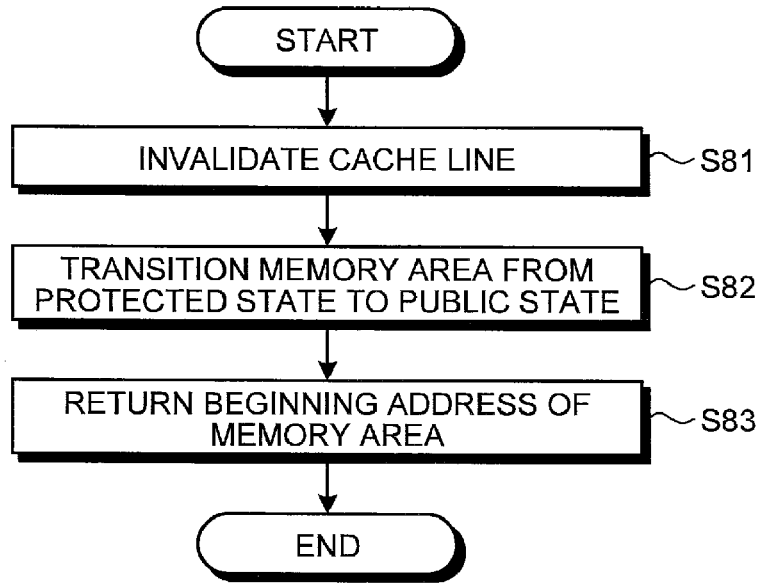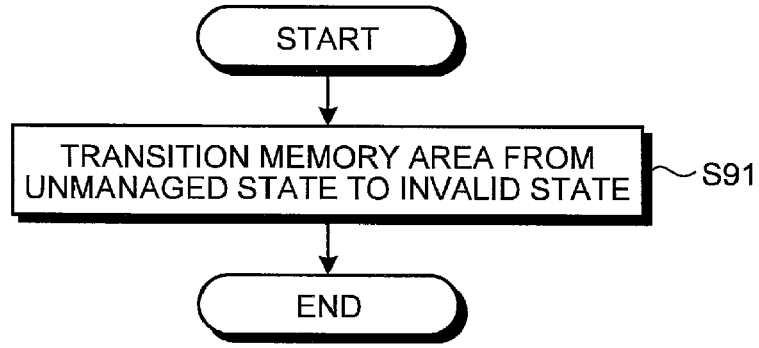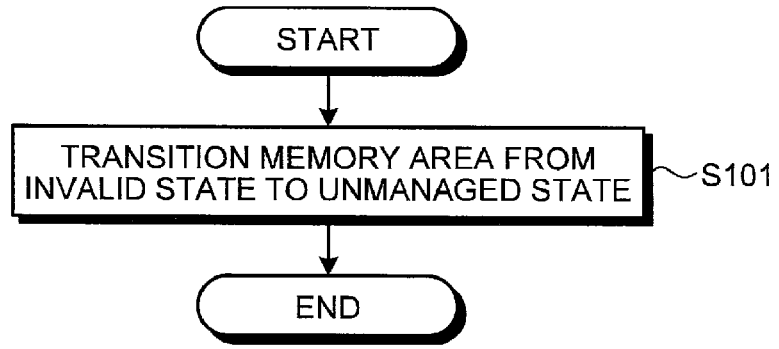

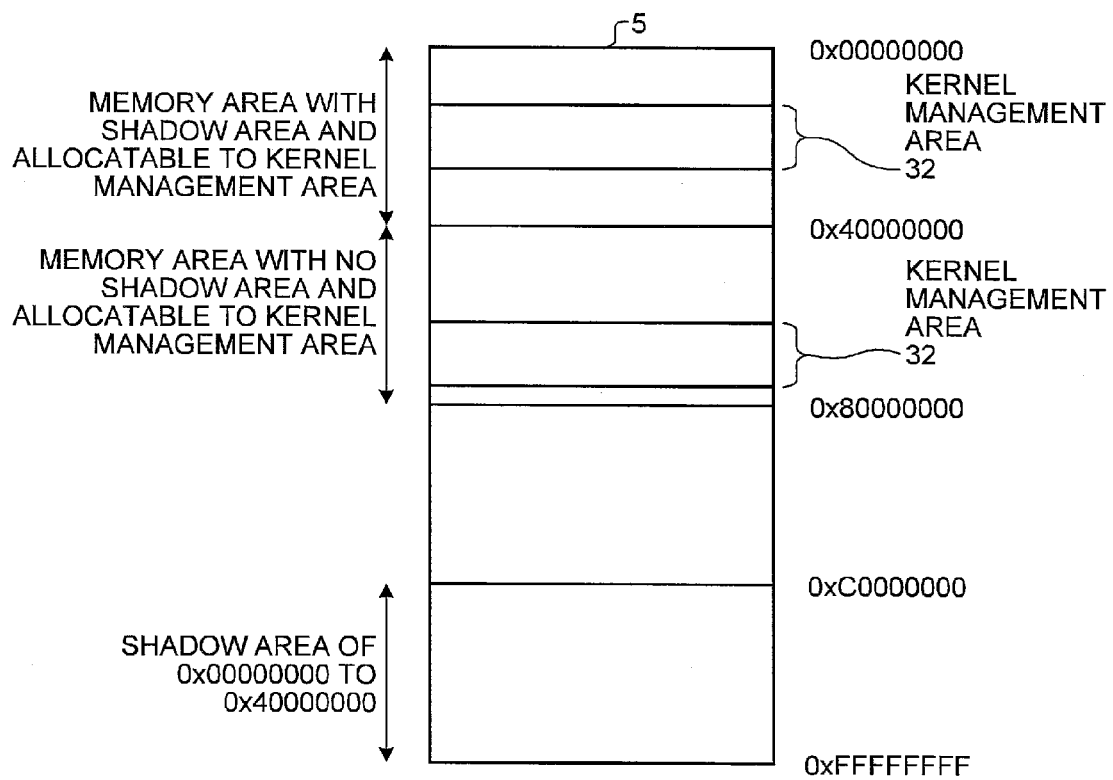

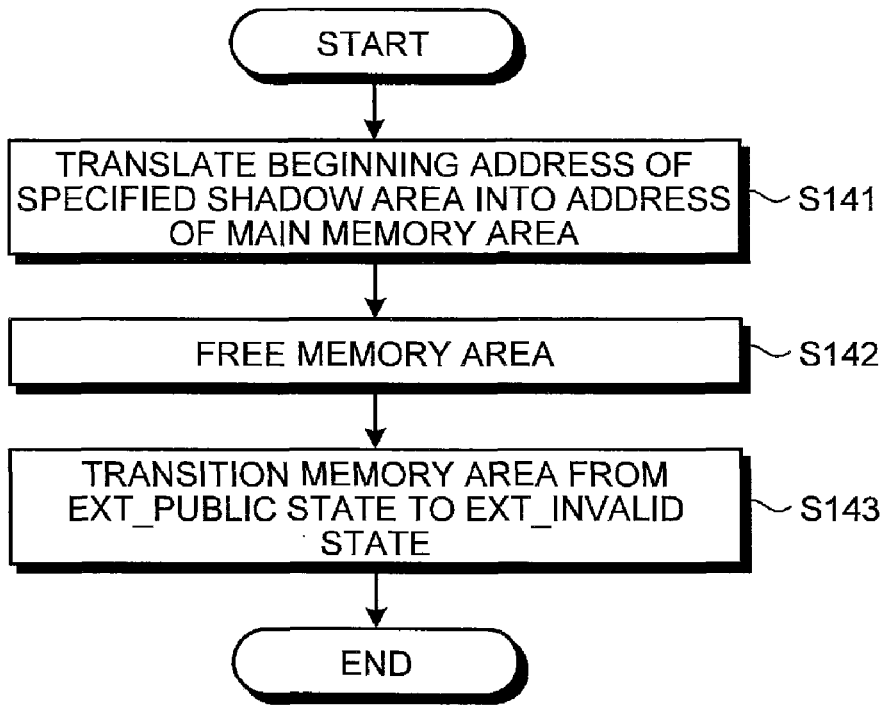
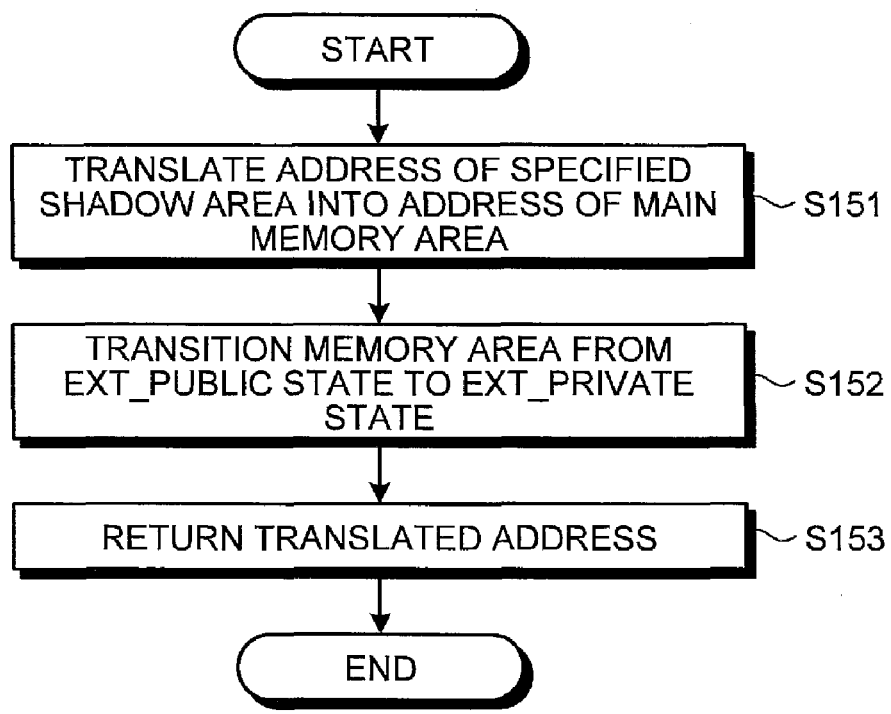

MULTI-CORE PROCESSOR SYSTEM AND MULTI-CORE PROCESSOR

CROSS-REFERENCE TO RELATED APPLICATIONS

This application is based upon and claims the benefit of priority from the prior Japanese Patent Application No. 2010-180156, filed on Aug. 11, 2010; the entire contents of which are incorporated herein by reference.

FIELD

Embodiments described herein relate generally to a multi-core processor system and a multi-core processor.

BACKGROUND

Conventionally, there has been a demand for development of a technology for implementing a function of maintaining cache coherency by software rather than a hardware mechanism for suppressing increase in chip area and power consumption.

BRIEF DESCRIPTION OF THE DRAWINGS

FIG. 8 is a flowchart explaining an example of a state transition;

FIG. 9 is a flowchart explaining an operation performed when allocate_private_memory is called;

FIG. 10 is a flowchart explaining an operation performed when free_private_memory is called;

FIG. 16 is a flowchart explaining an operation performed when close_protected_memory is called;

FIG. 17 is a flowchart explaining an operation performed when enter memory_access_protocol is called;

FIG. 18 is a flowchart explaining an operation performed when leave_memory_access_protocol is called;

FIG. 19 is a diagram explaining a memory structure of a memory according to a second embodiment;

FIG. 24 is a flowchart explaining an operation performed when free_ext_public_memory is called;

FIG. 25 is a flowchart explaining an operation performed when open_ext_private_memory is called;

DETAILED DESCRIPTION

In general, according to one embodiment, a multi-core processor system includes a multi-core processor that includes a plurality of processor cores each including a cache, and a first memory area in which an access using the cache is possible and an access without using the cache is impossible. The multi-core processor further includes a state managing unit and a cache/memory management unit. The state managing unit classifies an area allocated to the multi-core processor in the first memory area into one of a first state in which allocation to the processor cores is not performed, a second state in which allocation to one of the processor cores is performed and read and write are performed, and a third state in which allocation to one or more of the processor cores is performed and read and write are prohibited, and further performs a transition from one of the first state, the second state, and the third state to another. When the state managing unit performs the transition from the second state to the third state, the cache/memory management unit invalidates and writes back a corresponding cache line on the core where the transition is performed.

Exemplary embodiments of a multi-core processor system and a multi-core processor will be explained below in detail with reference to the accompanying drawings. The present invention is not limited to the following embodiments.

Figure 1:
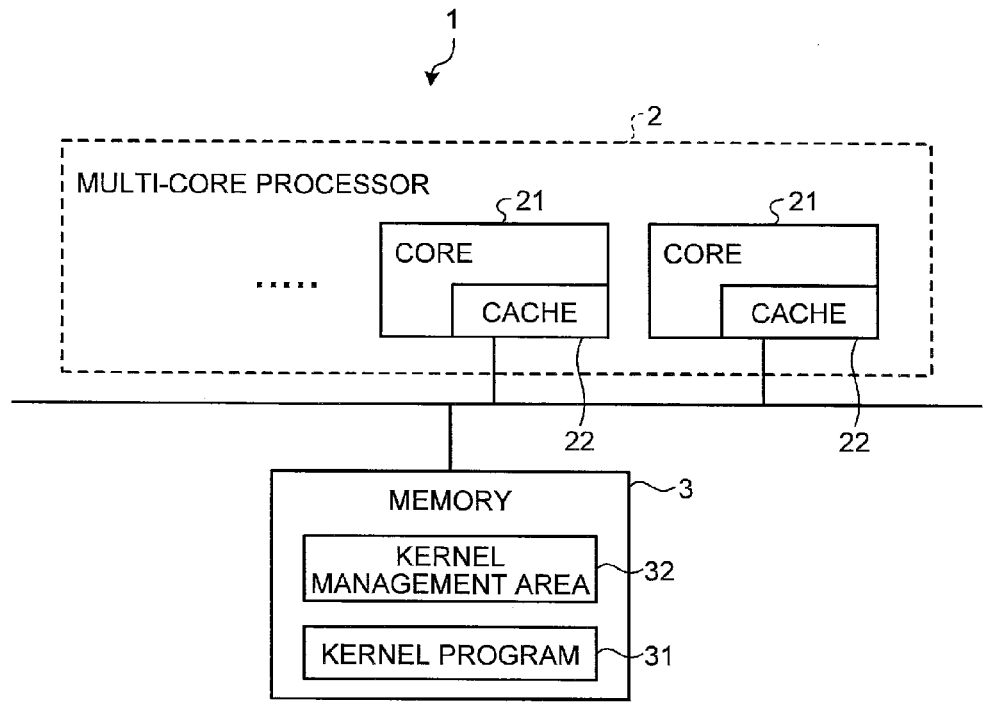
FIG. 1 is a block diagram illustrating a configuration of a multi-core processor system according to a first embodiment.

FIG. 1 is a block diagram illustrating a configuration of a multi-core processor system according to a first embodiment of the present invention.

A multi-core processor system 1 includes a multi-core processor 2 and a memory 3. The multi-core processor 2 and the memory 3 are connected to each other via a bus. The configuration can be such that these components are connected to each other in other network topologies such as mesh instead of the bus.

The multi-core processor 2 includes a plurality of cores (processor cores) 21 for executing a user task, and each core 21 includes a cache 22.

The memory 3, for example, includes a Random Access Memory (RAM). In the memory 3, a kernel program 31 for managing hardware resources of the multi-core processor 2 is loaded. Furthermore, a kernel management area 32 that the multi-core processor 2 can use as a main memory is reserved. The multi-core processor 2 allocates a memory area in the kernel management area 32 to each core 21 while maintaining coherency of the cache 22 by executing the kernel program 31.

In the following explanation, the operations expressed with the multi-core processor 2 as a main component are realized by the multi-core processor 2 (more precisely, the cores 21) executing the kernel program 31 or a user task (a user task 27 described later). The operations based on the kernel program 31 are expressed with the kernel program 31 as a main component in some cases. Furthermore, the kernel program 31 is abbreviated as the kernel 31 in some cases. Moreover, the operations based on the user task are expressed with the user task as a main component in some cases.

The load source of the kernel program 31 can be a nonvolatile memory area that, for example, includes a Read Only Memory (ROM), an external storage, or the like, in which the program is stored in advance.

Figure 2:
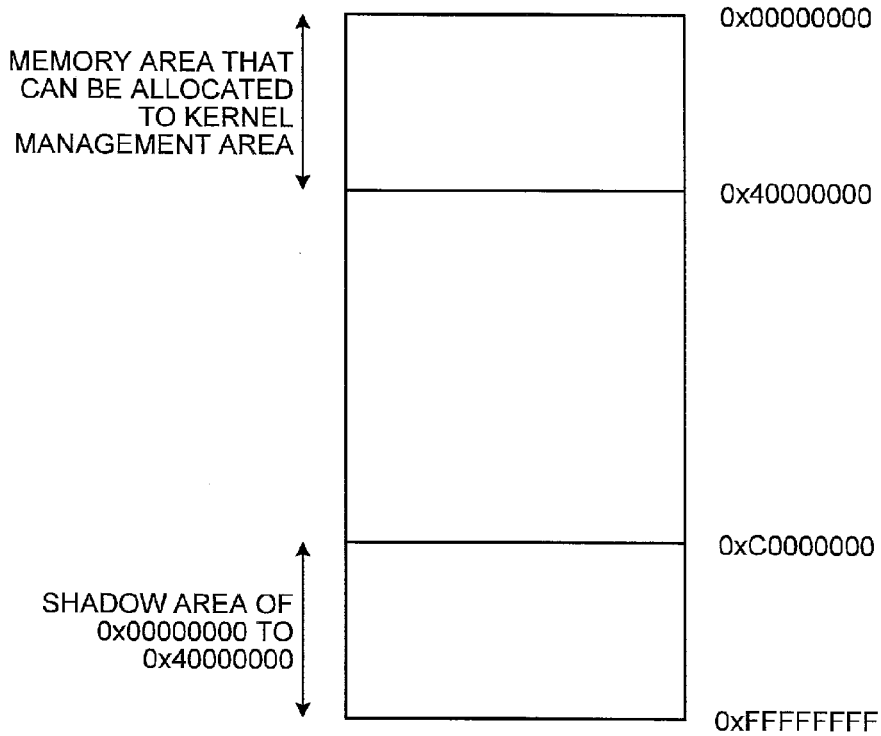
FIG. 2 is a diagram explaining a configuration example of a memory map in which both an access using a cache and an access without using a cache are possible.

FIG. 2 is a diagram explaining a configuration example of a memory map in which both an access using a cache and an access without using a cache from a plurality of cores are possible. For example, an area of 0x00000000 to 0x3FFFFFFF are mapped as a main memory area in a memory of 4 GB with addresses of 0x00000000 to 0xFFFFFFFF. When accessing the memory by using the cache, each core uses the address of the main memory area as an access destination. The main memory area is mirrored to a shadow area secured from 0xC0000000 to 0xFFFFFFFF. On the other hand, when accessing the memory without using the cache, each core accesses the address of the shadow area. In the system having the above memory map, as disclosed in Non-Patent Document 1 ("Toshiba's Next-Generation SoC "Venezia" Adopts Homogeneous Multicore" Nikkei Electronics, Nikkei Business Publications, Inc., vol. 981, Jun. 30, 2008, p. 111 and pp. 113-114, written by Yoshiro Tsuboi, Yutaka Ohta, and Takahiro Yamashita), cache coherency is maintained by using a method in which data shared by the cores is accessed by a direct access to a physical memory without using the cache and data possessed by each core is accessed by using the cache.

Figure 3:
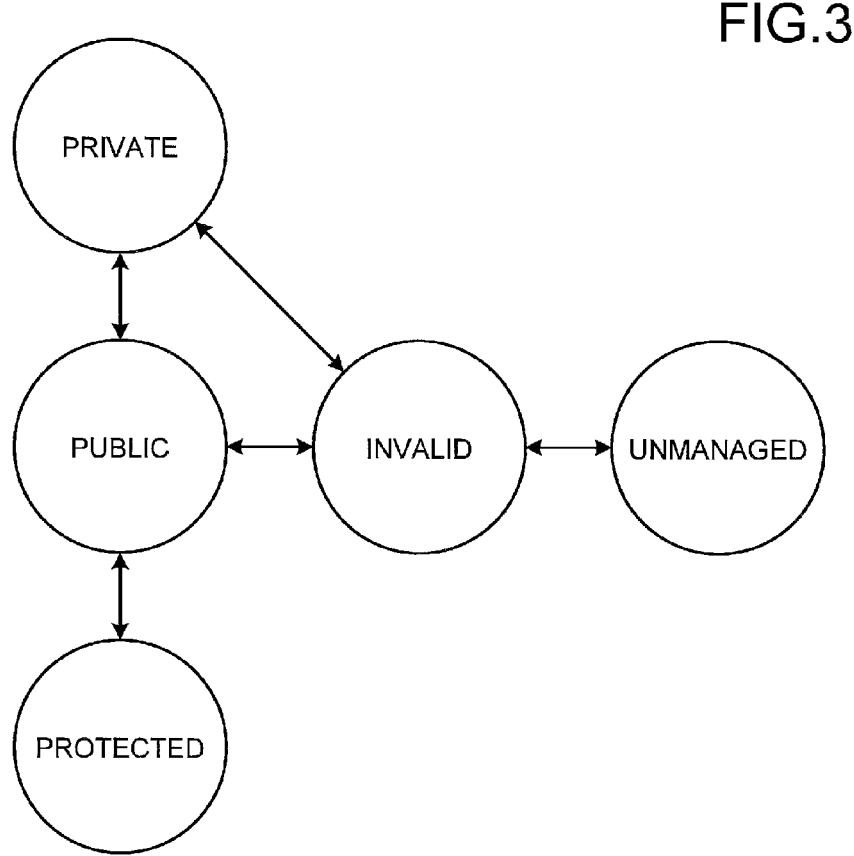
FIG. 3 is a diagram explaining a MAP according to the first embodiment.

In the memory map shown in FIG. 2, the shadow area with the size identical to the size of the area mapped as the main memory area is needed, so that an address space is reduced. Furthermore, it is needed to mount hardware for accessing the physical memory directly without using the cache, so that development costs for a chip increases. Therefore, in the first embodiment, a Memory Access Protocol (MAP) is defined as described below so that the cache coherency can be maintained with respect to a memory with no shadow area, i.e., a memory in which only an access using a cache is permitted. FIG. 3 is a diagram explaining the MAP according to the first embodiment.

As shown in FIG. 3, the following five states are defined for a memory area.

(a) UNMANAGED State

A state in which the memory area is out of the kernel management area 32 is defined as the UNMANAGED state. The kernel 31 does not manage the cache coherency in a memory area in this state.

(b) INVALID State (First State)

A state in which allocation to a user task (the core 21 executing the user task) is not performed by the kernel 31 and the allocation is possible is defined as the INVALID state. Specifically, the state before memory allocation and after memory freeing belongs to this state. No read/write access from any user tasks is permitted.

(c) PRIVATE State (Second State)

A state in which the read/write access using the cache 22 is performed is defined as the PRIVATE state. Only one user task transitioned to this state is permitted to perform the read/write access.

(d) PUBLIC State (Third State)

A state in which the memory area is shared by all of user tasks and in which no read/write access from any user tasks is permitted is defined as the PUBLIC state. When transmitting data to other user tasks, each user task must transition the data (i.e., a memory area in which the data is stored) to this state, and the user task on the receiving side must transition the data in this state to the PRIVATE state or a PROTECTED state described below to read the data.

(e) PROTECTED State (Fourth State)

A state in which the access using the cache 22 is possible only in the read access is defined as the PROTECTED state. The write access to an area in this state is impossible. Only one or more of the user tasks transitioned to this state is permitted to perform the read access using the cache 22.

The memory area contained in the kernel management area 32 is in any one of the INVALID state, the PRIVATE state, the PUBLIC state, and the PROTECTED state. Transition is possible between the INVALID state and the PUBLIC state and between the INVALID state and the PRIVATE state. The PUBLIC state can also be transitioned to the PRIVATE state and the PROTECTED state in addition to the INVALID state. In the kernel management area 32, the cache coherency is maintained by following the memory access based on the definition of each of the INVALID state, the PRIVATE state, the PUBLIC state, and the PROTECTED state and the relationship of the state transition.

The UNMANAGED state and the PROTECTED state are not the essential constituents of the structure for maintaining the cache coherency. However, by providing the PROTECTED state, simultaneous read-out from the plurality of cores 21 can be made possible. Furthermore, by setting an area that is not under the management of the kernel 31 to the UNMANAGED state and making the transition between the UNMANAGED state and the INVALID state possible, the multi-core processor system 1 can dynamically change the size of the kernel management area 32 placed under the management of the kernel 31.

Figure 4:
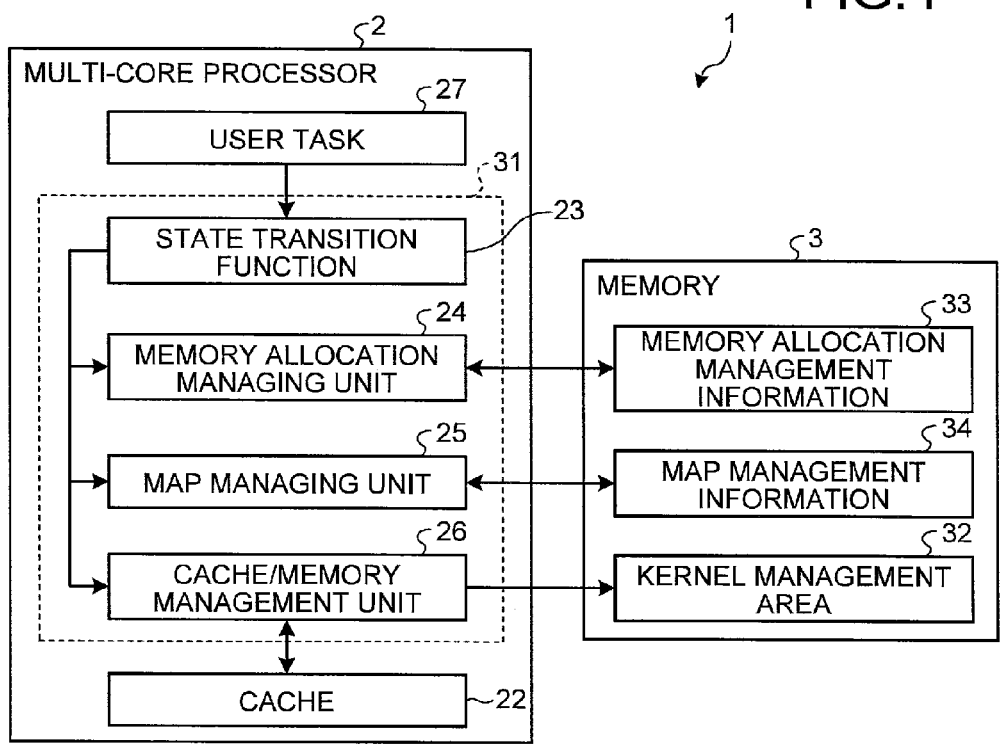
FIG. 4 is a diagram explaining a function configuration of the multi-core processor system according to the first embodiment.

FIG. 4 is a diagram explaining a function configuration of the multi-core processor system 1 according to the first embodiment of the present invention. As shown in FIG. 4, the multi-core processor 2 generates a state transition function 23, a memory allocation managing unit 24, a MAP managing unit 25, and a cache/memory management unit 26 by executing the kernel program 31. Furthermore, the multi-core processor 2 executes the user task 27.

The state transition function 23 is an API (Application Programming Interface) for performing the transition between the states defined in the MAP described above. The state transition function 23 includes the following ten functions.

(1) allocate_private_memory (size_t size)

The allocate_private_memory function is a function for allocating the memory area with a size specified by the argument "size" in the PRIVATE state from the memory area in the INVALID state.

(2) free_private_memory (void *addr, size_t size)

The free_private_memory function is a function for freeing the memory area specified by the beginning address "addr" and the size "size" from the PRIVATE state to the INVALID state.

(3) allocate_public_memory (size_t size)

The allocate_public_memory function is a function for allocating the memory area with a size specified by the argument "size" in the PUBLIC state from the memory area in the INVALID state.

(4) free_public_memory (void *addr, size_t size)

The free_public_memory function is a function for freeing the memory area specified by the beginning address "addr" and the size "size" from the PUBLIC state to the INVALID state.

(5) open_private_memory (void *addr, size_t size)

The open_private_memory function is a function for transitioning the memory area specified by the beginning address "addr" and the size "size" from the PUBLIC state to the PRIVATE state.

(6) close_private_memory (void *addr, size_t size)

The close_private_memory function is a function for transitioning the memory area specified by the beginning address "addr" and the size "size" from the PRIVATE state to the PUBLIC state.

(7) open_protected_memory (void *addr, size_t size)

The open_protected_memory function is a function for transitioning the memory area specified by the beginning address "addr" and the size "size" from the PUBLIC state to the PROTECTED state.

(8) close_protected_memory (void *addr, size_t size)

The close_protected_memory function is a function for transitioning the memory area specified by the beginning address "addr" and the size "size" from the PROTECTED state to the PUBLIC state.

(9) enter_memory_access_protocol (void *addr, size_t size)

The enter_memory_access_protocol function is a function for transitioning the memory area specified by the beginning address "addr" and the size "size" from the UNMANAGED state to the INVALID state.

(10) leave_memory_access_protocol (void *addr, size_t size)

The leave_memory_access_protocol function is a function for transitioning the memory area specified by the beginning address "addr" and the size "size" from the INVALID state to the UNMANAGED state.

In the first embodiment, (1) the allocate_private_memory and (3) the allocate_public_memory are collectively referred to as the allocate function in some cases. Furthermore, (2) the free_private_memory and (4) the free_public_memory are collectively referred to as the free function in some cases. Moreover, (5) the open_private_memory and (7) the open_protected_memory are collectively referred to as the open function in some cases. Furthermore, (6) the close_private_memory and (8) the close_protected_memory are collectively referred to as the close function in some cases.

The allocate function, the free function, the open function, and the close function are called by the user task 27, and an enter function (the enter_memory_access_protocol) and a leave function (the leave_memory_access_protocol) are called by the kernel 31 itself.

The memory allocation managing unit 24 and the MAP managing unit 25 cooperatively classify the kernel management area 32 into one of the states defined in the MAP, and function as a state managing unit that performs the transition between the states.

The memory allocation managing unit 24 manages increase and decrease of the kernel management area 32 and allocation and freeing of a memory area in the kernel management area 32 with respect to the user task 27. Specifically, the memory allocation managing unit 24 defines a binary variable isAllocated indicating whether or not a memory area in the kernel management area 32 is allocated to the user task 27, and updates and manages memory allocation management information 33 indicating the state of the variable isAllocated of the memory area in the kernel management area 32. The isAllocated variable is mainly used for searching for an area that is not allocated to a task in the kernel management area 32.

Figure 5:
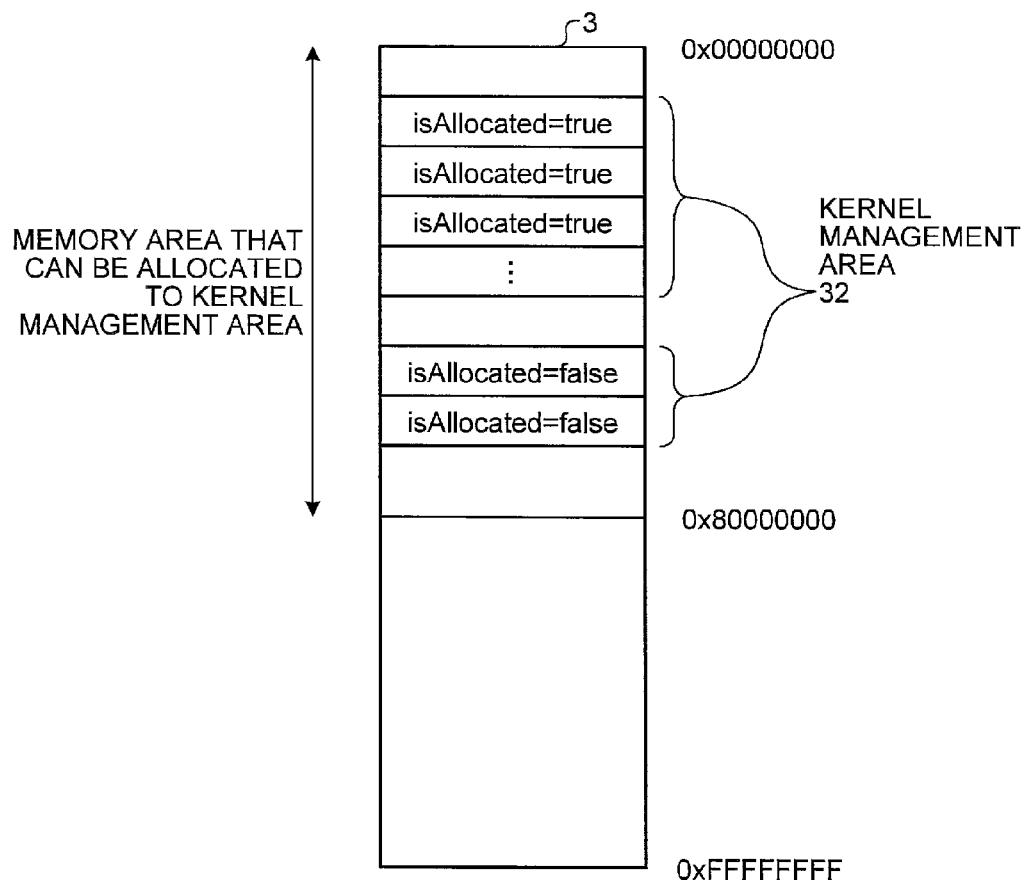
FIG. 5 is a diagram explaining a memory structure of a memory according to the first embodiment.

FIG. 5 is a diagram explaining a memory structure of the memory 3 according to the first embodiment. The kernel management area 32 is reserved in a memory area with no shadow area (first memory area). The user task 27 is already allocated to the memory area in which the isAllocated is "true" in the kernel management area 32, and one of the PRIVATE state, the PUBLIC state, and the PROTECTED state is set to the memory area. Furthermore, a task is not allocated to the area in which the isAllocated is "false", and the INVALID state is set to the area. The area other than the kernel management area 32 is not under the management of the kernel 31, and the isAllocated variable is not defined. It is assumed here that, as an example, the isAllocated variable is defined in a predetermined unit size.

Figures 6, 7:
FIG. 6 is a diagram explaining an example of a data structure of memory allocation management information.
FIG. 7 is a diagram explaining an example of a data structure of MAP management information.

FIG. 6 is a diagram explaining an example of a data structure of the memory allocation management information 33. The kernel management area 32 having one continuous address is defined with the beginning address indicated in a column "address" and the size of the area indicated in a column "size" in the memory allocation management information 33. When a plurality of the kernel management areas 32 each having a continuous address is present, a plurality of sets of the "address" and the "size" is defined. In a column "ID", an ID for distinguishing between a plurality of sets of the defined continuous kernel management areas 32 is written. In a column "isAllocated", the value of the isAllocated variable defined in a predetermined unit size is written for each continuous kernel management area 32. In this example, the isAllocated variable of the memory area in the kernel management area 32 of "ID0" indicates "false", "true", "false", . . . from the beginning.

When the enter function is called, the memory allocation managing unit 24 adds a corresponding entry to the memory allocation management information 33, and when the leave function is called, the memory allocation managing unit 24 deletes a corresponding entry from the memory allocation management information 33. Furthermore, when the allocate/free function is called, the memory allocation managing unit 24 operates the value of the isAllocated variable of a corresponding entry.

The MAP managing unit 25 manages the state of the MAP of the memory area to maintain the cache coherency in the kernel management area 32. Specifically, the MAP managing unit 25 classifies the state of the memory area into one of the four states of the INVALID state, the PUBLIC state, the PRIVATE state, and the PROTECTED state, registers the state in MAP management information 34, and updates and manages the MAP management information 34 in response to a call of the allocate/free function and the open/close function.

FIG. 7 is a diagram explaining an example of a data structure of the MAP management information 34. The MAP management information 34 has a table structure in which an entry containing an ID of the user task 27 (TASK ID), a state (STATE), an address, and a size is registered for each user task 27.

When the enter function is called, the MAP managing unit 25 adds a corresponding entry to the MAP management information 34, and when the leave function is called, the MAP managing unit 25 deletes a corresponding function from the MAP management information 34.

In this example, the area other than the kernel management area 32 is implicitly set to the UNMANAGED state and is not managed explicitly in both the memory allocation management information 33 and the MAP management information 34.

Furthermore, although the example is explained in which the memory allocation management information 33 has the table structure as an example of the data structure, the data structure of the memory allocation management information 33 is not limited to the table structure. For example, information in a list format or information in a bitmap format is also applicable. Similarly, the data structure of the MAP management information 34 is not limited to the table structure.

When the close_private_memory is called, the cache/memory management unit 26 writes the contents of a corresponding cache line in the cache 22 back to a corresponding memory area. Furthermore, when the close function is called, the cache/memory management unit 26 invalidates a corresponding cache line.

Next, the operation of the multi-core processor system 1 of the first embodiment is explained. First, as a summary of the operation, an example of the state transition is explained. FIG. 8 is a flowchart explaining an example of the state transition of a memory area.

The memory area is in the UNMANAGED state that is not managed by the kernel 31 (S1). In other words, this memory area is not included in the kernel management area 32. Next, the memory area is placed under the management of the kernel program 31, and the state of the MAP of the memory area is transitioned to the INVALID state (S2). In other words, this memory area is added to the kernel management area 32. Next, when the user task 27 calls the allocate_public_memory, the state of this memory area is transitioned to the PUBLIC state by the operation of the MAP managing unit 25 and this memory area is allocated to the user task 27 that has called the function (S3). Thereafter, when the user task 27 calls the open_private_memory, this memory area is transitioned to the PRIVATE state, and the user task 27 performs a read/write access using the cache 22 to this memory area (S4). During this access, an access from other user tasks 27 is not permitted, so that the coherency of the corresponding cache line is maintained properly. When the user task 27 calls the close_private_memory, this memory area is transitioned back to the PUBLIC state (S5). At this time, a corresponding cache line on the core where the transition is performed is properly written back to the physical memory by the cache/memory management unit 26.

Thereafter, when other user task 27 specifies this memory area and calls the open_protected_memory, this memory area is transitioned to the PROTECTED state by the MAP managing unit 25, and the user task 27 that has called the open_protected_memory performs a read access using the cache 22 to this memory area (S6). The call of the open_protected_memory can be performed simultaneously by the plurality of user tasks 27. That is, although the memory area in the PUBLIC state is registered in the MAP management information 34 such that the memory area is allocated to one of the user tasks 27, the memory area is virtually allocated to one or more of the user tasks 27. When the call is simultaneously performed by the plurality of user tasks 27, the memory area is allocated to the plurality of user tasks 27 that has performed the call.

When the user task 27 that has completed the read access calls the close_protected_memory, this memory area is transitioned back to the PUBLIC state (S7). Lastly, when any of the user tasks 27 calls the free_public_memory, this memory area is transitioned to the INVALID state (S8). Then, the leave_memory_access_protocol is called, so that the memory area is removed from under the management of the kernel and transitioned to the UNMANAGED state (S9), and the series of the operations ends.

In this manner, according to the first embodiment, it is possible to maintain the coherency of the cache 22 by a software mechanism using the memory 3 in which only an access using the cache 22 is permitted, and it is also possible to share data between the plurality of cores 21.

Next, the operation performed by the multi-core processor system 1 when each of the ten functions included in the state transition function 23 is called is explained.

FIG. 9 is a flowchart explaining an operation performed when the allocate_private_memory is called. When the user task 27 calls the allocate_private_memory, the memory allocation managing unit 24 sets "true" to the isAllocated variable of a continuous memory area with the size specified by the argument "size" in the memory area in which the isAllocated variable is "false" (i.e., the memory area in the INVALID state), and allocates this memory area to the user task 27 (S11). When the memory area with the specified size is not normally allocated because of the reason that the continuous area in the INVALID state is absence or the like (NO at S12), the memory allocation managing unit 24 returns NULL (S13), and the operation ends.

When the memory area with the specified size is normally allocated (YES at S12), the MAP managing unit 25 registers an entry containing the task ID of the user task 27 as the allocation destination, the state "PRIVATE", and the beginning address and the size of the allocated memory area in the MAP management information 34, so that the allocated memory area is transitioned from the INVALID state to the PRIVATE state (S14). Then, the memory allocation managing unit 24 returns the beginning address of the allocated memory area (S15), and the operation ends.

FIG. 10 is a flowchart explaining an operation performed when the free_private_memory is called. When the user task 27 calls the free_private_memory, the memory allocation managing unit 24 changes the isAllocated variable of the memory area with the beginning address indicated by the argument "addr" and the size indicated by the argument "size" from "true" to "false", so that this memory area is freed (S21). Furthermore, the MAP managing unit 25 deletes a corresponding entry from the MAP management information 34, so that the specified memory area is transitioned from the PRIVATE state to the INVALID sate (S22), and the operation ends.

Figure 11:
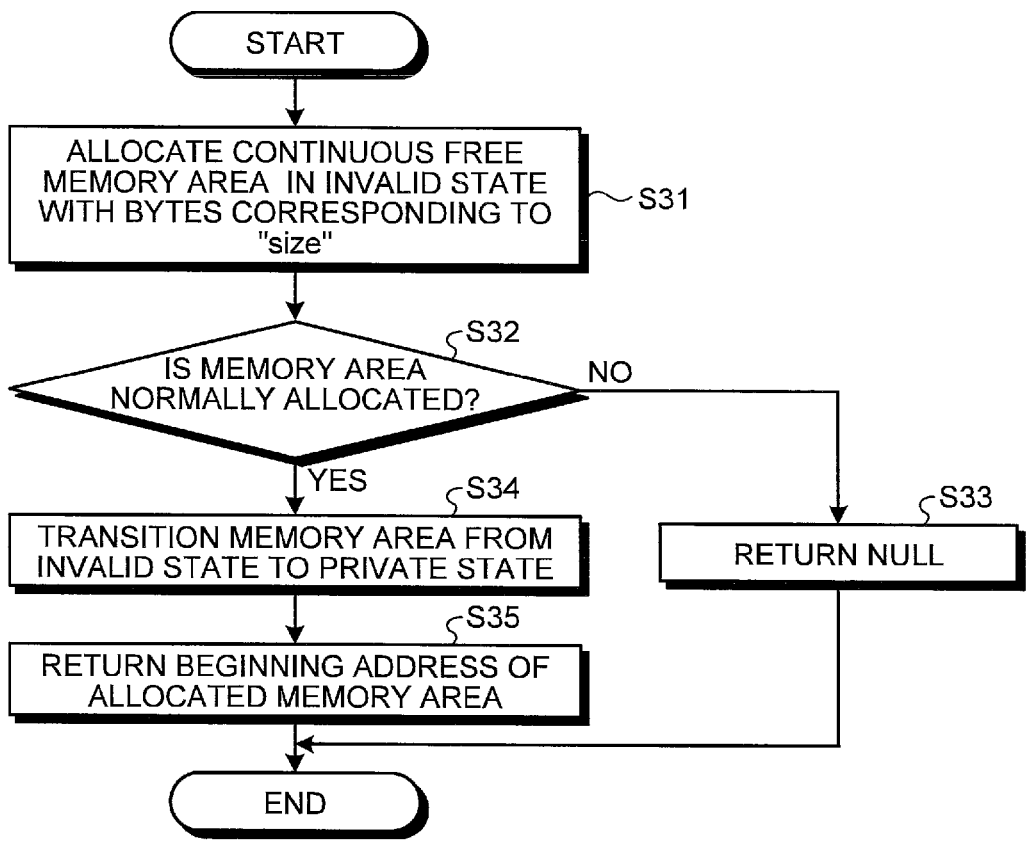
FIG. 11 is a flowchart explaining an operation performed when allocate_public_memory is called.

FIG. 11 is a flowchart explaining an operation performed when the allocate_public_memory is called. When the user task 27 calls the allocate_public_memory, the memory allocation managing unit 24 sets "true" to the isAllocated variable of a continuous memory area with the size specified by the argument "size" in the memory area in the INVALID state, and allocates this memory area to the user task 27 (S31). When the memory area with the specified size is not normally allocated (NO at S32), the memory allocation managing unit 24 returns NULL (S33), and the operation ends.

When the memory area with the specified size is normally allocated (YES at S32), the MAP managing unit 25 registers an entry containing the task ID of the user task 27 as the allocation destination, the state "PUBLIC", and the beginning address and the size of the allocated memory area in the MAP management information 34, so that the allocated memory area is transitioned from the INVALID state to the PUBLIC state (S34). Then, the memory allocation managing unit 24 returns the beginning address of the allocated memory area (S35), and the operation ends.

Figure 12:
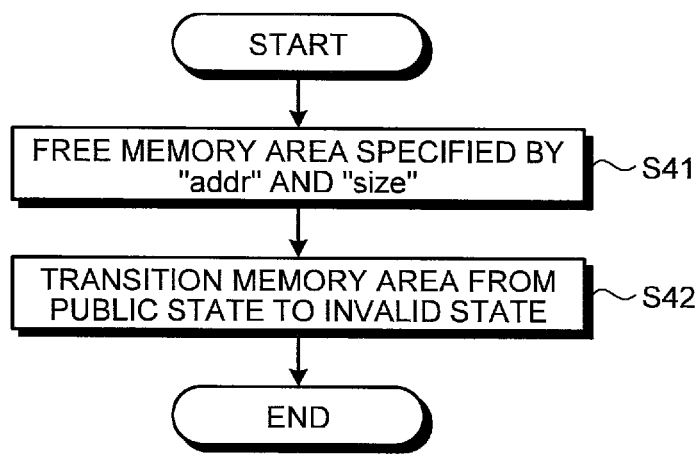
FIG. 12 is a flowchart explaining an operation performed when free public_memory is called.

FIG. 12 is a flowchart explaining an operation performed when the free_public_memory is called. When the user task 27 calls the free_public_memory, the memory allocation managing unit 24 changes the isAllocated variable of the memory area specified by the argument "addr" and the argument "size" from "true" to "false", so that the specified memory area is freed (S41). Furthermore, the MAP managing unit 25 deletes a corresponding entry from the MAP management information 34, so that the specified memory area is transitioned from the PUBLIC state to the INVALID state (S42), and the operation ends.

Figure 13:
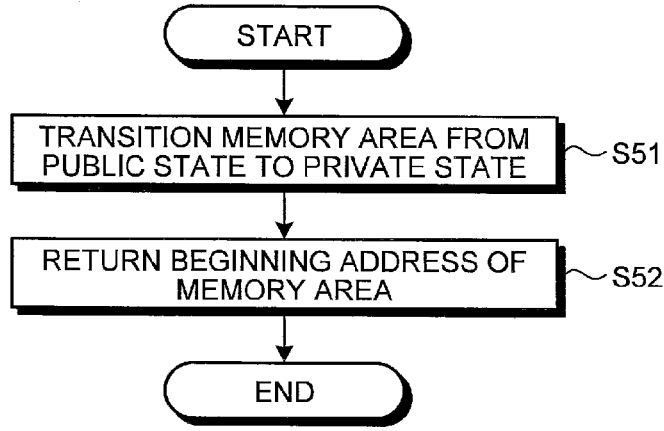
FIG. 13 is a flowchart explaining an operation performed when open_private_memory is called.

FIG. 13 is a flowchart explaining an operation performed when the open_private_memory is called. When the user task 27 calls the open_private_memory, the MAP managing unit 25 changes the state of the memory area specified by the argument "addr" and the argument "size" and registered in the MAP management information 34 from the PUBLIC state to the PRIVATE state (S51). Then, the MAP managing unit 25 returns the beginning address of the memory area of which state is changed (S52), and the operation ends.

Figure 14:
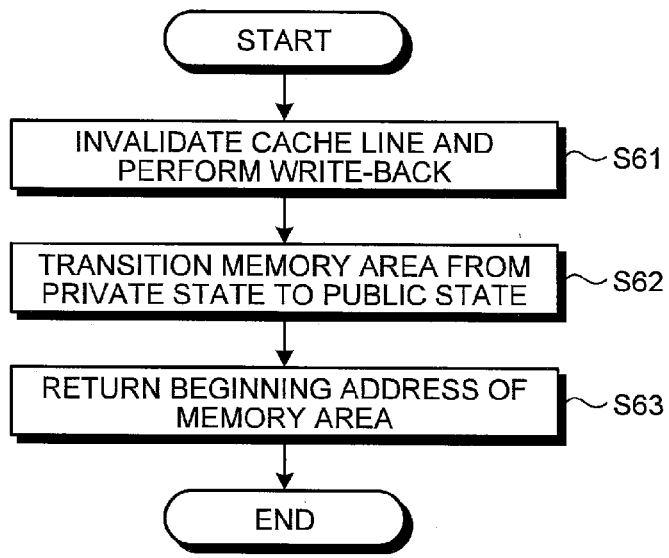
FIG. 14 is a flowchart explaining an operation performed when close_private_memory is called.

FIG. 14 is a flowchart explaining an operation performed when the close_private_memory is called. When the user task 27 calls the close_private_memory, the cache/memory management unit 26 invalidates the cache line on which the memory area specified by the argument "addr" and the argument "size" is placed, and writes back the cache line (S61). Then, the MAP managing unit 25 changes the state of the memory area registered in the MAP management information 34 from the PRIVATE state to the PUBLIC state (S62). Then, the MAP managing unit 25 returns the beginning address of the memory area of which state is changed (S63), and the operation ends.

Figure 15:
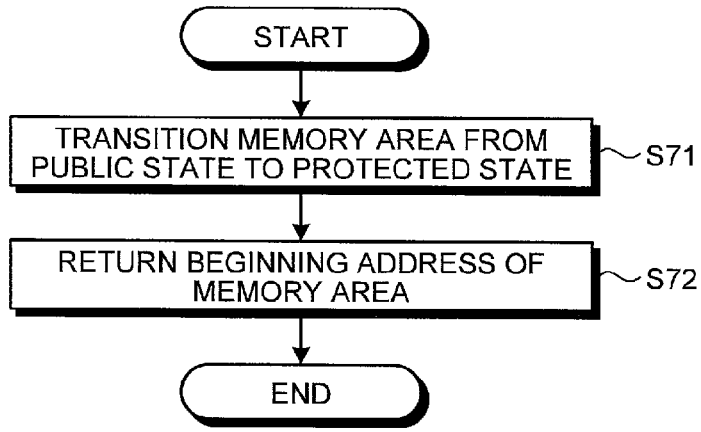
FIG. 15 is a flowchart explaining an operation performed when open_protected_memory is called.

FIG. 15 is a flowchart explaining an operation performed when the open_protected_memory is called. When the user task 27 calls the open_protected_memory, the MAP managing unit 25 changes the state of the memory area specified by the argument "addr" and the argument "size" and registered in the MAP management information 34 from the PUBLIC state to the PROTECTED state (S71). Then, the MAP managing unit 25 returns the beginning address of the memory area of which state is changed (S72), and the operation ends.

FIG. 16 is a flowchart explaining an operation performed when the close_protected_memory is called. When the user task 27 calls the close_protected_memory, the cache/memory management unit 26 invalidates the cache lines of the cores where the call is performed on which the memory area specified by the argument "addr" and the argument "size" is placed (S81). Then, the MAP managing unit 25 changes the state of the memory area registered in the MAP management information 34 from the PROTECTED state to the PUBLIC state (S82). Then, the MAP managing unit 25 returns the beginning address of the memory area of which state is changed (S83), and the operation ends.

FIG. 17 is a flowchart explaining an operation performed when the enter_memory_access_protocol is called. When the kernel 31 executes the enter_memory_access_protocol, the memory allocation managing unit 24 generates an entry of the memory area specified by the argument "addr" and the argument "size" and registers this memory area in the memory allocation management information 33, so that this memory area is transitioned from the UNMANAGED state to the INVALID state (S91), and the operation ends.

FIG. 18 is a flowchart explaining an operation performed when the leave_memory_access_protocol is called. When the kernel 31 executes the leave_memory_access_protocol, the memory allocation managing unit 24 deletes an entry of the memory area specified by the argument "addr" and the argument "size" from the memory allocation management information 33, so that this memory area is transitioned from the INVALID state to the UNMANAGED state (S101), and the operation ends.

The kernel 31 preferably calls the enter_memory_access_protocol when the memory area in the INVALID state decreases, and calls the leave_memory_access_protocol when the memory area in the INVALID state excessively increases. When the kernel 31 fails to allocate the memory area in the INVALID state with the size specified at Sll (i.e., in the case of NO at S12), it is possible for the kernel 31 to call the enter_memory_access_protocol to reserve the memory area in the INVALID state.

As described above, according to the first embodiment, the memory allocation managing unit 24 and the MAP managing unit 25 cooperatively classify the kernel management area 32 into one of the INVALID state (the first state) in which allocation to the cores 21 is not performed, the PRIVATE state (the second state) in which allocation to one of the cores 21 is performed and read and write using the cache 22 is performed, and the PUBLIC state (the third state) in which allocation to one or more of the processor cores is performed and read and write are prohibited, and further perform the transition between the states. Furthermore, the cache/memory management unit 26 is configured to write back a corresponding cache line when the MAP managing unit 25 performs the transition from the PRIVATE state to the PUBLIC state. Therefore, the cache coherency in the memory in which only an access using the cache 22 is permitted can be maintained by software. That is, even in the multi-core processor system that includes a memory with no shadow area, it is possible to maintain the cache coherency by software. As for the transition between the PUBLIC state and the PRIVATE state and between the PUBLIC state and the PROTECTED state, it is sufficient if at least one of them is possible.

Furthermore, the MAP managing unit 25 is configured to perform the transition between the PROTECTED state (the fourth state), in which allocation to one or more of the cores 21 is performed and the read access is performed, and the PUBLIC state. Therefore, it is possible to simultaneously perform read-out from the plurality of cores 21 by performing the transition to the PROTECTED state.

Moreover, the memory allocation managing unit 24 is configured to allocate/free the memory area in the INVALID state from/to the UNMANAGED area in which allocation to the multi-core processor 2 is not performed. Therefore, it is possible to dynamically increase and decrease the kernel management area 32.

In the above explanation, it is explained that the multi-core processor 2 generates the state transition function 23, the memory allocation managing unit 24, the MAP managing unit 25, and the cache/memory management unit 26 by executing the kernel program 31; however, it is possible to realize any of the above units by a program other than the kernel program 31. For example, it is possible to realize the state transition function 23 and the MAP managing unit 25 by middleware.

When the memory shown in FIG. 2 is employed, the memory area that can be used as the kernel management area is limited to the memory area with the shadow area. In view of this, according to a second embodiment, it is enabled to reserve the kernel management area both in a memory area with the shadow area (second memory area) and a memory area with no shadow area (first memory area).

The configuration of the multi-core processor system according to the second embodiment is the same as the first embodiment except for the kernel program loaded on the memory. Detailed explanation of the same components is not repeated.

FIG. 19 is a diagram explaining a memory structure of a memory according to the second embodiment. The memory of the second embodiment is configured such that the memory area with the shadow area (the second memory area) and the memory area with no shadow area (the first memory area) are reserved so that both the memory areas can be used as the kernel management area 32. In the second embodiment, the configuration of the MAP is modified so that the coherency of the cache 22 can be maintained both when the kernel management area 32 is reserved in one of the above memory areas and when the kernel management area 32 is reserved in the other of the above memory areas.

Figure 20:
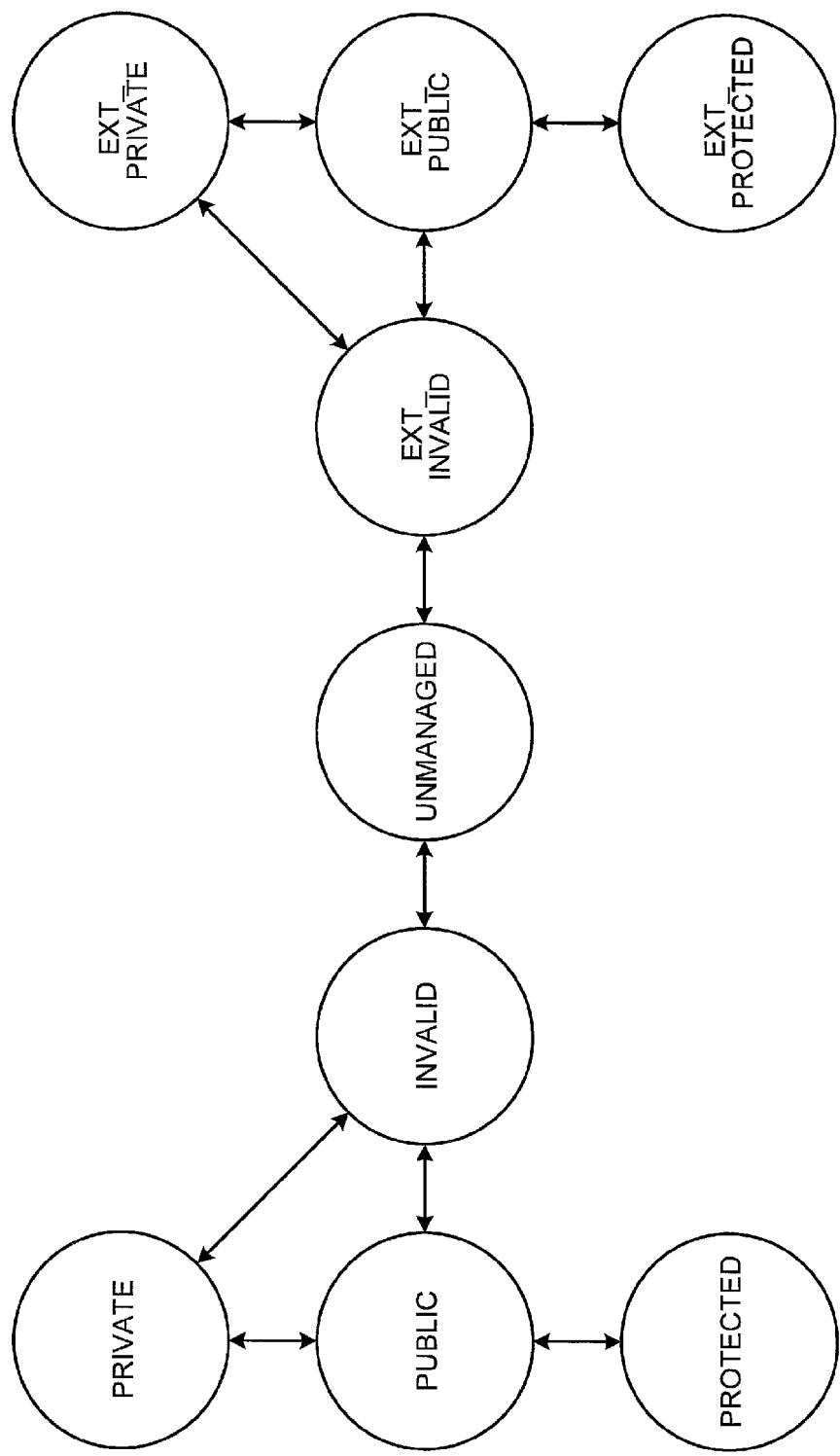
FIG. 20 is a diagram explaining a MAP according to the second embodiment.

FIG. 20 is a diagram explaining the MAP according to the second embodiment. The MAP of the second embodiment is configured to have the following four states for accessing the memory area with the shadow area in addition to the states of the MAP of the first embodiment for accessing the memory area with no shadow area.

(f) EXT_INVALID State (Fifth State)

A state in which allocation to a user task is not performed by a kernel 31 and the allocation is possible is defined as the EXT_INVALID state.

(g) EXT_PRIVATE State (Sixth State)

A state in which the read/write access using the cache 22 is performed is defined as the EXT_PRIVATE state. Only one user task transitioned to this state is permitted to perform the read/write access.

(h) EXT_PUBLIC State (Seventh State)

A state in which the read/write access without using the cache is performed is defined as the EXT_PUBLIC state. A user task transitioned to this state can share data with other user tasks. A difference from (c) the PUBLIC state lies in that the read/write access without using the cache can be performed.

(i) EXT_PROTECTED State

A state in which the read access using the cache 22 is performed is defined as the EXT_PROTECTED state. The write access to an area in this state is impossible. Only one or more user tasks transitioned to this state is permitted to perform the read access using the cache 22.

The function configuration of the multi-core processor system according to the second embodiment is the same as the multi-core processor system of the first embodiment shown in FIG. 4. The multi-core processor 2 generates the state transition function 23, the memory allocation managing unit 24, the MAP managing unit 25, and the cache/memory management unit 26 by executing the kernel program 31. Furthermore, the multi-core processor 2 executes the user task 27.

The state transition function 23 includes the following ten functions in addition to the functions (1) to (10) explained in the first embodiment.

(11) allocate_ext_private_memory (size_t size)

The allocate_ext_private_memory function is a function for allocating the memory area with a size specified by the argument "size" in the EXT_PRIVATE state from the memory area in the EXT_INVALID state.

(12) free_ext_private_memory (void *addr, size_t size)

The free_ext_private_memory function is a function for freeing the memory area specified by the beginning address "addr" and the size "size" from the EXT_PRIVATE state to the EXT_INVALID state.

(13) allocate_ext_public_memory (size_t size)

The allocate_ext_public_memory function is a function for allocating the memory area with a size specified by the argument "size" in the EXT_PUBLIC state from the memory area in the EXT_INVALID state.

(14) free_ext_public_memory (void *addr, size_t size)

The free_ext_public_memory function is a function for freeing the memory area specified by the beginning address "addr" and the size "size" from the EXT_PUBLIC state to the EXT_INVALID state.

(15) open_ext_private_memory (void *addr, size_t size)

The open_ext_private_memory function is a function for transitioning the memory area specified by the beginning address "addr" and the size "size" from the EXT_PUBLIC state to the EXT_PRIVATE state.

(16) close_ext_private_memory (void *addr, size_t size)

The close_ext_private_memory function is a function for transitioning the memory area specified by the beginning address "addr" and the size "size" from the EXT_PRIVATE state to the EXT_PUBLIC state.

(17) open_ext_protected_memory (void *addr, size_t size)

The open_ext_protected_memory function is a function for transitioning the memory area specified by the beginning address "addr" and the size "size" from the EXT_PUBLIC state to the EXT_PROTECTED state.

(18) close_ext_protected_memory (void *addr, size_t size)

The close_ext_protected_memory function is a function for transitioning the memory area specified by the beginning address "addr" and the size "size" from the EXT_PROTECTED state to the EXT_PUBLIC state.

(19) enter_ext_memory_access_protocol (void *addr, size_t size)

The enter_ext_memory_access_protocol function is a function for transitioning the memory area specified by the beginning address "addr" and the size "size" from the UNMANAGED state to the EXT_INVALID state.

(20) leave_ext_memory_access_protocol (void *addr, size_t size)

The leave_ext_memory_access_protocol function is a function for transitioning the memory area specified by the beginning address "addr" and the size "size" from the EXT_INVALID state to the UNMANAGED state.

In the second embodiment, (1) the allocate_private_memory, (3) the allocate_public_memory, (11) the allocate_ext_private_memory, and (13) the allocate_ext_public_memory are collectively referred to as the allocate function in some cases. Furthermore, (2) the free_private_memory, (4) the free_public_memory, (12) the free_ext_private_memory, and (14) the free_ext_public_memory are collectively referred to as the free function in some cases. Moreover, (5) the open_private_memory, (7) the open_protected_memory, (15) the open_ext_private_memory, and (17) the open_ext_protected_memory are collectively referred to as the open function in some cases. Furthermore, (6) the close_private_memory, (8) the close_protected_memory, (16) the close_ext_private_memory, and (18) the close_ext_protected_memory are collectively referred to as the close function in some cases.

The allocate function, the free function, the open function, and the close function are called by the user task 27, and an enter function (the enter_memory_access_protocol and the enter_ext_memory_access_protocol) and a leave function (the leave_memory_access_protocol and the leave_ext_memory_access_protocol) are called by the kernel 31 itself.

The memory allocation managing unit 24 updates and manages the memory allocation management information 33 having the same data structure as that of the first embodiment.

The memory allocation managing unit 24 recognizes a range of the memory area with the shadow area within the memory 3, and when the enter_memory_access_protocol is called, the memory allocation managing unit 24 transitions the memory area in the UNMANAGED state and with no shadow area to the INVALID state. On the other hand, when the enter_ext_memory_access_protocol is called, the memory allocation managing unit 24 transitions the memory area in the UNMANAGED state and with the shadow area to the EXT_INVALID state.

The MAP managing unit 25 manages the state of the memory area in the kernel management area 32 based on the MAP shown in FIG. 20. Specifically, the MAP managing unit 25 classifies the state of the memory area into one of the six states of the PUBLIC state, the PRIVATE state, the PROTECTED state, the EXT_PUBLIC state, the EXT_PRIVATE state, and the EXT_PROTECTED state for each memory area allocated to the user task 27, i.e., for each memory area of which isAllocated variable is "true", and registers the state in the MAP management information 34. Furthermore, the MAP managing unit 25 updates and manages the MAP management information 34 in response to the call of the allocate/free function and the open/close function. The data structure of the MAP management information 34 is the same as the data structure of the MAP management information 34 shown in FIG. 7.

In both the memory allocation management information 33 and the MAP management information 34, the INVALID state and the EXT_INVALID state are not managed distinctly from each other. However, it is possible to manage these two states distinctly from each other based on information on either one of the states. For example, it is possible to include an information bit indicating presence and absence of the shadow area in each entry of the memory allocation management information 33 to make it possible to distinguish whether the memory area of which isAllocated is "false" is in the EXT_INVALID state or the INVALID state. Furthermore, it is possible to manage the memory area in the INVALID state or the EXT_INVALID state by the MAP management information 34.

When the close_private_memory or the close_ext_private_ memory is called, the cache/memory management unit 26 writes the contents of a corresponding cache line in the cache 22 back to a corresponding memory area. Furthermore, when the close function is called, the cache/memory management unit 26 invalidates a corresponding cache line.

Moreover, when the allocate_public_memory, the close_private_memory, or the close_protected_memory is called, the cache/memory management unit 26 translates the (beginning) address of the memory area specified by the argument "addr" into the address of a corresponding shadow area. Furthermore, when the free_public_memory, the open_private_memory, or the open_protected_memory is called, the cache/memory management unit 26 translates the address of the shadow area specified by the argument "addr" into the address of a corresponding memory area.

Figure 21:
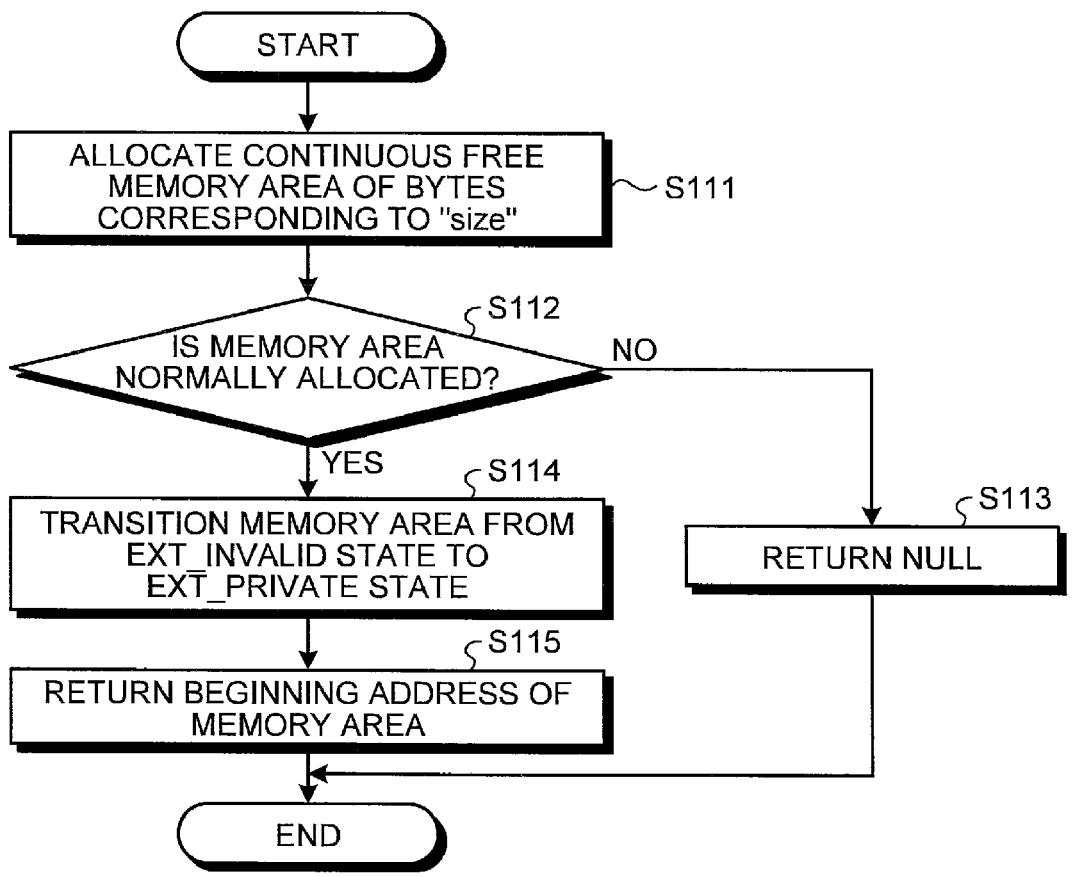
FIG. 21 is a flowchart explaining an operation performed when allocate_ext_private_memory is called.

Next, the operation of the multi-core processor system 1 of the second embodiment is explained. FIG. 21 is a flowchart explaining an operation performed when the allocate_ext_private_memory is called. When the user task 27 calls the allocate_ext_private_memory, the memory allocation managing unit 24 sets "true" to the isAllocated variable of a continuous memory area which has the size specified by the argument "size" in the memory area with the shadow area and of which isAllocated variable is "false" (i.e., the memory area in the EXT_INVALID state), and allocates this memory area to the user task 27 (S111). When the memory area with the specified size is not normally allocated because of the reason that the continuous area in the EXT_INVALID state is absence or the like (NO at S112), the memory allocation managing unit 24 returns NULL (S113), and the operation ends.

When the memory area with the specified size is normally allocated (YES at S112), the MAP managing unit 25 registers an entry containing the task ID of the user task 27 as the allocation destination, the state "EXT_PRIVATE", and the beginning address and the size of the allocated memory area in the MAP management information 34, so that the allocated memory area is transitioned from the EXT_INVALID state to the EXT_PRIVATE state (S114). Then, the memory allocation managing unit 24 returns the beginning address of the allocated memory area (S115), and the operation ends.

Figure 22:
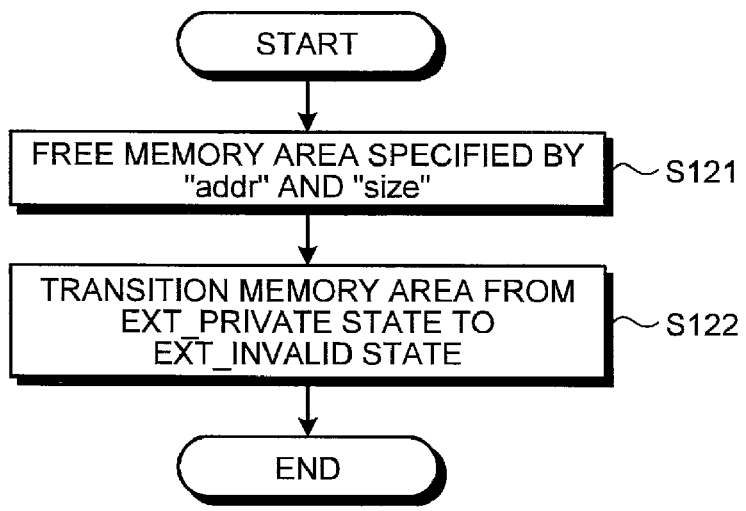
FIG. 22 is a flowchart explaining an operation performed when free_ext_private_memory is called.

FIG. 22 is a flowchart explaining an operation performed when the free_ext_private_memory is called. As shown in FIG. 22, when the user task 27 calls the free_ext_private_memory, the memory allocation managing unit 24 changes the isAllocated variable of the memory area with the beginning address indicated by the argument "addr" and the size indicated by the argument "size" from "true" to "false", so that this memory area is freed (S121). Furthermore, the MAP managing unit 25 deletes a corresponding entry from the MAP management information 34, so that the specified memory area is transitioned from the EXT_PRIVATE state to the EXT_INVALID sate (S122), and the operation ends.

Figure 23:
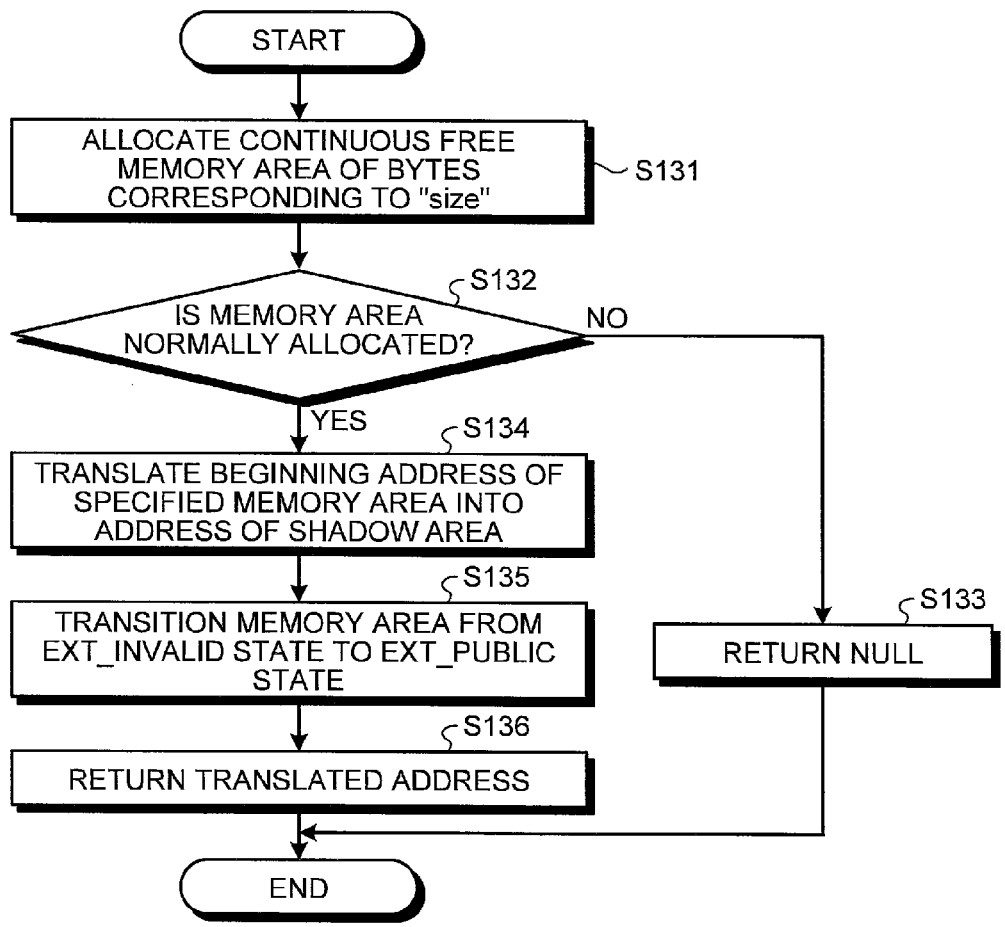
FIG. 23 is a flowchart explaining an operation performed when allocate_ext_public_memory is called.

FIG. 23 is a flowchart explaining an operation performed when the allocate_ext_public_memory is called. When the user task 27 calls the allocate_ext_public_memory, the memory allocation managing unit 24 sets "true" to the isAllocated variable of a continuous memory area with the size specified by the argument "size" in the memory area in the EXT_INVALID state, and allocates this memory area to the user task 27 (S131). When the memory area with the specified size is not normally allocated (NO at S132), the memory allocation managing unit 24 returns NULL (S133), and the operation ends. When the memory area with the specified size is normally allocated (YES at S132), the cache/memory management unit 26 translates the beginning address of the specified memory area into the address of the shadow area (S134).

Subsequently, the MAP managing unit 25 registers an entry containing the task ID of the user task 27 as the allocation destination, the state "EXT_PUBLIC", and the beginning address and the size of the allocated memory area (the beginning address before translation) in the MAP management information 34, so that the allocated memory area is transitioned from the EXT_INVALID state to the EXT_PUBLIC state (S135). Then, the memory allocation managing unit 24 returns the beginning address of the allocated memory area (S136), and the operation ends.

FIG. 24 is a flowchart explaining an operation performed when the free_ext_public_memory is called. When the user task 27 calls the free_ext_public_memory, the cache/memory management unit 26 translates the address of the shadow area specified by the argument "addr" into the address of the memory area with the shadow area (S141). Then, the memory allocation managing unit 24 changes the isAllocated variable of the memory area specified by the translated address and the argument "size" from "true" to "false", so that the specified memory area is freed (S142). Furthermore, the MAP managing unit 25 deletes a corresponding entry from the MAP management information 34, so that the specified memory area is transitioned from the EXT_PUBLIC state to the EXT_INVALID state (S143), and the operation ends.

FIG. 25 is a flowchart explaining an operation performed when the open_ext_private_memory is called. When the user task 27 calls the open_ext_private_memory, the cache/memory management unit 26 translates the address of the shadow area specified by the argument "addr" into the address of the memory area with the shadow area (S151). Then, the MAP managing unit 25 changes the state of the memory area specified by the translated address and the argument "size" and registered in the MAP management information 34 from the EXT_PUBLIC state to the EXT_PRIVATE state (S152). Then, the MAP managing unit 25 returns the translated beginning address of the memory area (S153), and the operation ends.

Figure 26:
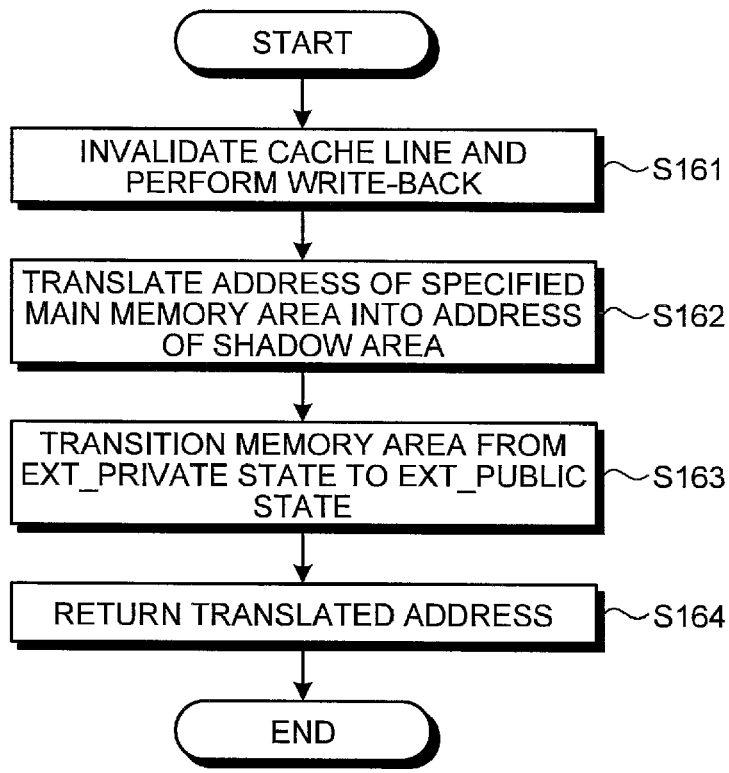
FIG. 26 is a flowchart explaining an operation performed when close_ext_private_memory is called.

FIG. 26 is a flowchart explaining an operation performed when the close_ext_private_memory is called. When the user task 27 calls the close_ext_private_memory, the cache/memory management unit 26 invalidates the cache line on which the memory area specified by the argument "addr" and the argument "size" is placed, and writes back the cache line (S161). Then, the cache/memory management unit 26 translates the address of the specified memory area into the address of the shadow area (S162). Then, the MAP managing unit 25 changes the state of the memory area registered in the MAP management information 34 from the EXT_PRIVATE state to the EXT_PUBLIC state (S162). Then, the MAP managing unit 25 returns the translated beginning address (S164), and the operation ends.

Figure 27:
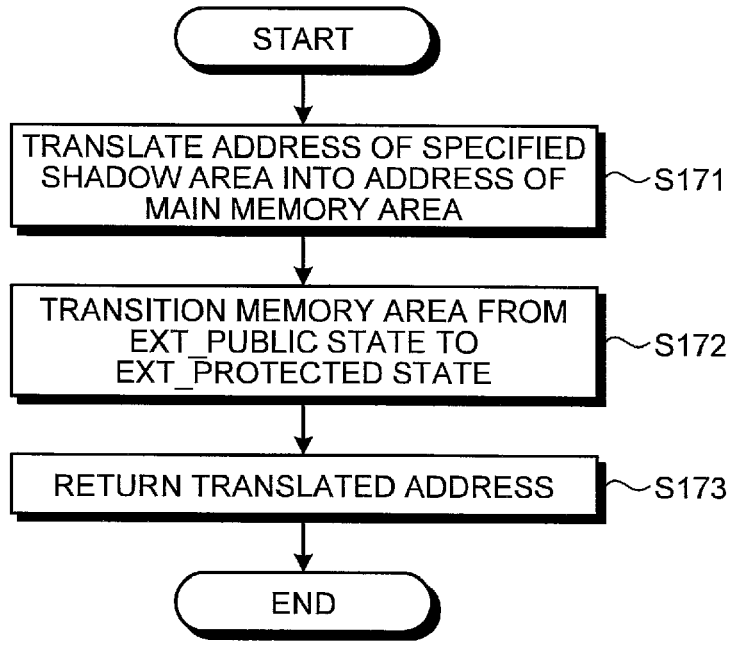
FIG. 27 is a flowchart explaining an operation performed when open_ext_protected_memory is called.

FIG. 27 is a flowchart explaining an operation performed when the open_ext_protected_memory is called. When the user task 27 calls the open_ext_protected_memory, the cache/memory management unit 26 translates the address of the shadow area specified by the argument "addr" into the address of the memory area with no shadow area (S171). Then, the MAP managing unit 25 changes the state of the memory area specified by the translated address and the argument "size" and registered in the MAP management information 34 from the EXT_PUBLIC state to the EXT_PROTECTED state (S172). Then, the MAP managing unit 25 returns the translated address (S173), and the operation ends.

Figure 28:
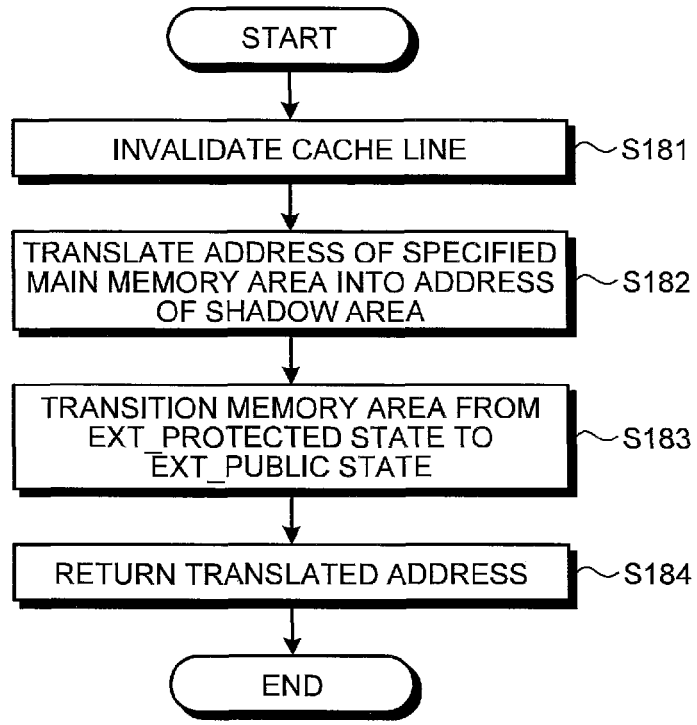
FIG. 28 is a flowchart explaining an operation performed when close_ext_protected_memory is called.

FIG. 28 is a flowchart explaining an operation performed when the close_ext_protected_memory is called. When the user task 27 calls the close_ext_protected_memory, the cache/memory management unit 26 invalidates the cache lines of all the cores on which the memory area specified by the argument "addr" and the argument "size" is placed (S181). Then, the cache/memory management unit 26 translates the address of the specified memory area into the address of the shadow area (S182), and the state of the memory area registered in the MAP management information 34 is changed from the EXT_PROTECTED state to the EXT_PUBLIC state (S183). Then, the MAP managing unit 25 returns the translated address (S184), and the operation ends.

Figure 29:
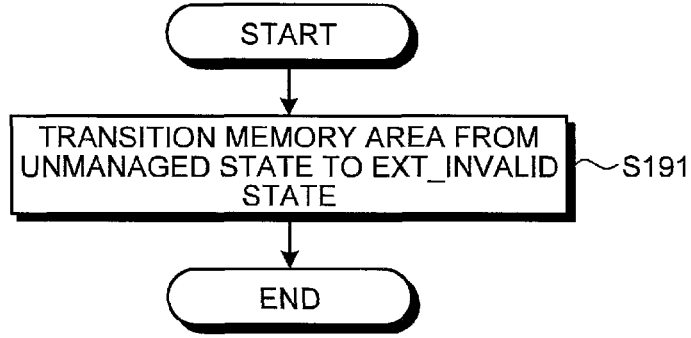
FIG. 29 is a flowchart explaining an operation performed when enter_ext_memory_access_protocol is called.

FIG. 29 is a flowchart explaining an operation performed when the enter_ext_memory_access_protocol is called. When the kernel 31 executes the enter_ext_memory_access_protocol, the memory allocation managing unit 24 generates an entry of the memory area specified by the argument "addr" and the argument "size" and registers this memory area in the memory allocation management information 33, so that this memory area is transitioned from the UNMANAGED state to the EXT_INVALID state (S191), and the operation ends.

Figure 30:
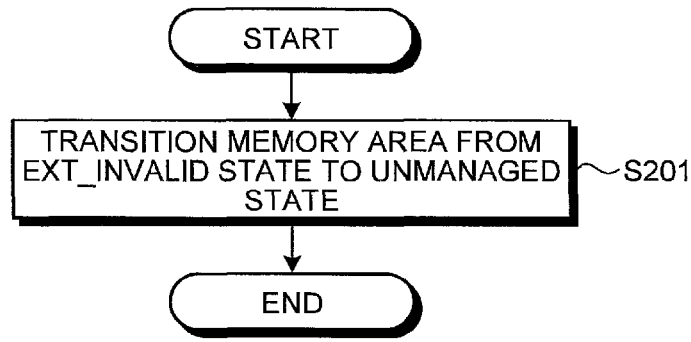
FIG. 30 is a flowchart explaining an operation performed when leave_ext_memory_access_protocol is called.

FIG. 30 is a flowchart explaining an operation performed when the leave_ext_memory_access_protocol is called. When the kernel 31 executes the leave_ext_memory_access_protocol, the memory allocation managing unit 24 deletes an entry of the memory area specified by the argument "addr" and the argument "size" from the memory allocation management information 33, so that this memory area is transitioned from the EXT_INVALID state to the UNMANAGED state (S201), and the operation ends.

As described above, according to the second embodiment, the memory allocation managing unit 24 and the MAP managing unit 25 cooperatively classify the kernel management area 32 reserved in the memory area with the shadow area into one of the EXT_INVALID state (the fifth state) in which allocation to the cores 21 is not performed, the EXT_PRIVATE state (the sixth state) in which allocation to one of the cores 21 is performed and read and write using the cache 22 are performed, and the EXT_PUBLIC state (the seventh state) in which allocation to one or more of the cores 21 is performed and read and write without using the cache 22 are performed, and further perform the transition from one of the EXT_INVALID state, the EXT_PRIVATE state, and the EXT_PUBLIC state to another. Furthermore, the cache/memory management unit 26 is configured to write back a corresponding cache line when the MAP managing unit 25 performs the transition from the EXT_PRIVATE state to the EXT_PUBLIC state. Therefore, it is possible to place the kernel management area 32 in both the memory area with the shadow area and the memory area with no shadow area. Consequently, it is possible to increase the memory area to be used as the main memory compared with the system in which only a memory with the shadow area is used as the main memory or the system in which only a memory area with no shadow area is used as the main memory.

Furthermore, the memory allocation managing unit 24 is configured to allocate/free the memory area in the EXT_INVALID state from/to the memory area in the UNMANAGED state in which allocation to the multi-core processor is not performed. Therefore, it is possible to dynamically increase and decrease the kernel management area 32 reserved in the memory area with the shadow area.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A multi-core processor system comprising:
  a multi-core processor that includes a plurality of processor cores each including a cache; and
  a shared memory that includes a first memory area in which an access using the cache is possible and an access without using the cache is impossible, that is shared by the plurality of processor cores, and that is connected to the multi-core processor via a bus, wherein
  the multi-core processor includes
    a state manager that classifies an area allocated to the multi-core processor in the first memory area into one of a first state in which allocation to the processor cores is not performed, a second state in which allocation to one of the processor cores is performed and read and write are performed, and a third state in which allocation to one or more of the processor cores is performed and read and write are prohibited, and further performs a transition from one of the first state, the second state, and the third state to another; and a cache/memory manager that writes back a corresponding cache line on the core where the transition is performed.

2. The multi-core processor system according to claim 1, wherein
the state manager performs at least one of the transition between the first state and the second state and the transition between the first state and the third state as well as the transition between the second state and the third state.

3. The multi-core processor system according to claim 2, wherein
the state into which the first memory area is classified includes a fourth state in which allocation to one or more of the processor cores is performed and a read access is performed, and
the state manager performs the transition between the third state and the fourth state.

4. The multi-core processor system according to claim 1, wherein
the state manager reserves and releases a memory area in the first state from and to an area that is not allocated to the multi-core processor in the first memory area.

5. The multi-core processor system according to claim 1, wherein
the state manager updates and manages memory access protocol management information in which the states are recorded for each area allocated to each processor core.

6. The multi-core processor system according to claim 1, wherein
the multi-core processor executes a user task, and
the state manager performs the transition between the states based on a request from the user task.

7. The multi-core processor system according to claim 4, wherein
the multi-core processor executes a kernel program, and
the state manager reserves and releases a memory area in the first state based on a request from the kernel program.

8. The multi-core processor system according to claim 1, wherein
the shared memory further includes a second memory area in which an access using the cache and an access without using a cache are possible,
the state manager classifies an area allocated to the multi-core processor in the second memory area into one of a fifth state in which allocation to the processor cores is not performed, a sixth state in which allocation to one of the processor core is performed and read and write using the cache is performed, and a seventh state in which allocation to one or more of the processor cores is performed and read and write without using the cache is performed, and further performs a transition from one of the fifth state, the sixth state, and the seventh state to another, and
the cache/memory manager writes back a corresponding cache when the state manager performs the transition from the sixth state to the seventh state.

9. The multi-core processor system according to claim 8, wherein
the shared memory includes a shadow area of the second memory area for allowing the processor cores to perform an access without using the cache, and
the cache/memory manager translates an access destination address between the shadow area and the second memory area when the state manager performs the transition to the seventh state or performs the transition from the seventh state to the other states.

10. The multi-core processor system according to claim 8, wherein
the state manager reserves and releases a memory area in the fifth state from and to an area that is not allocated to the multi-core processor in the second memory area.

11. The multi-core processor system according to claim 8, wherein
the state manager updates and manages memory access protocol management information in which the states are recorded for each area allocated to each processor core.

12. A multi-core processor which includes a plurality of processor cores each including a cache and to which a first memory area in which an access using the cache is possible and an access without using the cache is impossible is allocated, the multi-core processor comprising:
a state manager that classifies an area allocated to the multi-core processor in the first memory area into one of a first state in which allocation to the processor cores is not performed, a second state in which allocation to one of the processor cores is performed and read and write are performed, and a third state in which allocation to one or more of the processor cores is performed and read and write are prohibited, and further performs a transition from one of the first state, the second state, and the third state to another; and
a cache/memory manager that writes back a corresponding cache line on the core where the transition is performed.

13. The multi-core processor according to claim 12, wherein
the state manager performs at least one of the transition between the first state and the second state and the transition between the first state and the third state as well as the transition between the second state and the third state.

14. The multi-core processor according to claim 13, wherein
the state into which the first memory area is classified includes a fourth state in which allocation to one or more of the processor cores is performed and a read access is performed, and
the state manager performs the transition between the third state and the fourth state.

15. The multi-core processor according to claim 12, wherein
the state manager reserves and releases a memory area in the first state from and to an area that is not allocated to the multi-core processor in the first memory area.

16. The multi-core processor according to claim 12, wherein
the state manager updates and manages memory access protocol management information in which the states are recorded for each area allocated to each processor core.

17. The multi-core processor according to claim 12, further comprising:
a second memory area in which an access using the cache and an access without using the cache are possible, and which is allocated to the multi-core processor, wherein
the state manager classifies an area allocated to the multi-core processor in the second memory area into one of a fifth state in which allocation to the processor cores is not performed, a sixth state in which allocation to one of the processor cores is performed and read and write using the cache is performed, and a seventh state in which allocation to one or more of the processor cores is performed and read and write without using the cache is performed, and further performs a transition from one of the fifth state, the sixth state, and the seventh state to another, and the cache/memory manager writes back a corresponding cache when the state manager performs the transition from the sixth state to the seventh state.

18. The multi-core processor according to claim 17, further comprising:

a shadow area corresponding to the second memory area for use by the processor cores to perform an access without using the cache, wherein the cache/memory manager translates an access destination address between the shadow area and the second memory area when the state manager performs the transition to the seventh state or performs the transition from the seventh state to the other states.

19. The multi-core processor according to claim 17, wherein the state manager reserves and releases a memory area in the fifth state from and to an area that is not allocated to the multi-core processor in the second memory area.

20. The multi-core processor according to claim 17, wherein the state manager updates and manages memory access protocol management information in which the states are recorded for each area allocated to each processor core.

* * * * *